(12) United States Patent  
Smits

(10) Patent No.: US 11,575,210 B2  
(45) Date of Patent: Feb. 7, 2023

(54) ARRANGEMENT FOR COMMUNICATION BETWEEN MOTOR VEHICLES, AND REFLECTOR DEVICE

(71) Applicant: Continental Automotive GmbH, Hannover (DE)

(72) Inventor: Thomas Smits, Straelen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/858,130

(22) Filed: Apr. 24, 2020

(65) Prior Publication Data

US 2021/0167515 A1 Jun. 3, 2021

Related U.S. Application Data

(63) Continuation of application No. PCT/EP2018/078375, filed on Oct. 17, 2018.

(51) Int. Cl.  
*H01Q 15/14* (2006.01)  
*H01Q 15/16* (2006.01)

(52) U.S. Cl.  
CPC .................................. *H01Q 15/16* (2013.01)

(58) Field of Classification Search  
CPC .................. H01Q 15/14; H01Q 15/16; H01Q 15/161–168; H04B 47/145  
See application file for complete search history.

(56) References Cited

U.S. PATENT DOCUMENTS

| 5,697,063 | A | 12/1997 | Kishigami et al. |
| 2012/0206299 | A1 | 8/2012 | Valdes-Garcia |
| 2013/0038433 | A1 | 2/2013 | Ullrich |
| 2015/0197248 | A1* | 7/2015 | Breed .................... G08G 1/167 701/93 |
| 2015/0270624 | A1* | 9/2015 | Fattouche .............. H01Q 15/14 342/417 |
| 2019/0288400 | A1* | 9/2019 | Izadian ................. G01S 13/426 |

FOREIGN PATENT DOCUMENTS

| DE | 700339 C | 12/1940 |
| DE | 102011010846 A1 | 8/2012 |
| EP | 2487665 A1 | 8/2012 |
| JP | 2005009243 A | 1/2005 |
| KR | 20050083249 A | 8/2005 |
| KR | 20130042400 A | 4/2013 |
| KR | 20150071131 A | 6/2015 |

OTHER PUBLICATIONS

International Search Report and Written Opinion dated Jan. 7, 2019 from corresponding International Patent Application No. PCT/EP2018/078375.

* cited by examiner

*Primary Examiner* — Seokjin Kim

(57) ABSTRACT

An arrangement for communication between motor vehicles is specified. The arrangement comprises a reflector apparatus that is secured at a fixed location in the outer region of a curve or of a curve-like road. The reflector apparatus is in an orientation such that said reflector apparatus deflects electromagnetic radiation in the frequency band between 2.5 GHz and 7.5 GHz that is emitted by a first motor vehicle, situated in the region of a curve entrance, toward a second motor vehicle, situated in the region of a curve exit. Furthermore, a corresponding reflector apparatus for the arrangement is specified.

12 Claims, 5 Drawing Sheets

ARRANGEMENT FOR COMMUNICATION BETWEEN MOTOR VEHICLES, AND REFLECTOR DEVICE

CROSS-REFERENCE TO RELATED APPLICATIONS

This U.S. patent application claims the benefit of PCT patent application No. PCT/EP2018/078375, filed Oct. 17, 2018, which claims the benefit of German patent application No. 10 2017 219 397.2, filed Oct. 27, 2017, both of which are hereby incorporated by reference.

TECHNICAL FIELD

The invention relates to an arrangement for communication between motor vehicles and to a corresponding reflector apparatus.

BACKGROUND

In the vehicle-to-vehicle communication (known as "Car2Car") field, motor vehicles can send one another messages in a frequency band between 2.5 GHz and 7.5 GHz, e.g. in order to communicate their respective own position, speed and direction of movement to other motor vehicles. Under less-than-ideal propagation conditions, in particular if the communicating parties do not have direct visual contact, limitations in the communication can arise. Moreover, a transmission power and/or a transmission interval for transmitting messages may be limited. In particular if the communicating parties move toward one another at high speed, this can lead to useful communication no longer being possible.

To date, what are known as "roadside units" have been employed in this regard, which are supposed to prevent limitations in the communication. Such "roadside units" are active communication endpoints that serve as relay station. However, they are comparatively costly both to purchase and operate and to maintain.

It is therefore desirable to provide an arrangement for communication between motor vehicles that is inexpensive both to produce and operate and to maintain.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to a first aspect, an arrangement for communication between motor vehicles, comprises a reflector apparatus that is secured at a fixed location in the outer region of a curve or of a curve-like road. The reflector apparatus is in an orientation such that said reflector apparatus deflects electromagnetic radiation in the frequency band between 2.5 GHz and 7.5 GHz that is emitted by a first motor vehicle, situated in the region of a curve entrance, toward a second motor vehicle, situated in the region of a curve exit.

The reflector apparatus can be of purely passive design, which contributes to inexpensive production, operation and maintenance of the arrangement. In particular, there is the opportunity to implement standard geometries for a reflector of the reflector apparatus and also arrangements for covering similar situations, so as thereby to benefit from a scaling effect.

A curve or curve-like road refers here and below to a road profile that describes a curvature, in particular one curvature, between curve entrance and curve exit. This also encompasses, *mutatis mutandis*, road junctions, entrances and exits and similar road profiles requiring an altered steering angle or an altered yaw rate relative to a motor vehicle travelling straight ahead. In particular, it also covers road profiles for which the trajectories of two motor vehicles intersect. The region of the curve entrance or exit denotes a road section in each case here and below. In particular, the region of the curve entrance and exit defines two road sections in which two motor vehicles are in radio range by means of the reflector apparatus, but are not in visual contact with one another owing to the road profile. An actual point at which the curve mathematically begins or ends is arranged in the respective road section optionally.

The outer region of the curve or curve-like road is situated on the side of the road on which a tangent laid beside the road does not intersect the road in the region of the curve. The reflector apparatus is for example arranged away from the road or projects in over the road from said side.

The reflector apparatus is for example oriented tangentially or substantially tangentially with respect to the road.

In one refinement according to the first aspect, the reflector apparatus is secured to an existing building, mast or tree. This allows inexpensive, flexible, practically unlimited placement.

In a further refinement according to the first aspect, the arrangement comprises at least one further reflector apparatus, wherein the reflector apparatuses are arranged at a fixed location in the outer region of the curve or of the curve-like road in a distributed manner or in combination.

This allows adaptation to the respective situation. As such, multiple reflector apparatuses can be used for elongate curves with low curvature, while a single reflector apparatus suffices for short, sharply curved curves. Multiple reflector apparatuses allow in particular multiple reflection of the emitted electromagnetic radiation to be brought about.

Distributed reflector apparatuses denote reflector apparatuses in a physically separate arrangement. Reflector apparatuses arranged in combination, on the other hand, denote reflector apparatuses having a common reflector. The common reflector can have, in exemplary fashion, a plurality of differently curved surface segments, so that said multiple reflection is brought about. Alternatively or additionally, it is thus also possible to achieve multiple scattering and/or focusing regions of the emitted electromagnetic radiation.

In a further refinement according to the first aspect, the reflector apparatuses are secured in an orientation such that the electromagnetic radiation emitted by the first motor vehicle is reflected toward the at least one further reflector apparatus by the reflector apparatus and is deflected to the second motor vehicle by said further reflector apparatus.

It is thus possible for in particular elongate curves having low curvature to be spanned in order to be able to ensure reliable communication by the motor vehicles.

According to a second aspect, a reflector apparatus for an arrangement according to the first aspect is provided. The reflector apparatus comprises a reflector configured to deflect electromagnetic radiation in the frequency band between 2.5 GHz and 7.5 GHz.

The reflector may have a surface area of 0.25 m² or greater, inclusive. Depending on the situation, the surface area of the reflector when multiple reflector apparatuses are arranged in combination can also be 5 m² or more. By way of example, the reflector extends at a height of 30 cm or above to a height of 150 cm.

In one refinement according to the second aspect, the reflector is configured to deflect electromagnetic radiation in the frequency band between 5.8 GHz inclusive and 5.9 GHz inclusive. By way of example, a surface of the reflector is to this end in a form optimized for this frequency band in particular, in the spirit of positive reflection properties. By way of example, the surface is to this end in as smooth a form as possible, for example by means of a coat of lacquer and/or polishing, so that this helps to prevent diffuse reflection of the electromagnetic radiation.

In a further refinement, the reflector apparatus comprises a mast or a standpipe. The reflector is secured to the mast or standpipe.

In a further refinement according to the second aspect, the reflector comprises or consists of a metal sheet.

In a further refinement according to the second aspect, a surface of the reflector is convexly curved in at least one direction. This allows a spreading or directing effect when deflecting the emitted electromagnetic radiation.

In a further refinement according to the second aspect, a surface of the reflector is concavely curved in at least one direction. This allows a focusing or amplifying effect when deflecting the emitted electromagnetic radiation.

In a further refinement according to the second aspect, a surface of the reflector is planar.

In a further refinement according to the second aspect, the reflector apparatus comprises a heater for selectively adjusting the temperature of the reflector. This ensures reliable operation of the arrangement even under adverse weather conditions. In particular, the heater in this regard can comprise temperature-based feedback control and be configured to thaw the reflector. The heater is of battery-based design, for example. Optionally, there can be provision in this instance for a solar panel to charge the battery. Alternatively, a connection to the electricity grid is also conceivable.

In a further refinement according to the second aspect, the reflector apparatus comprises thermal insulation for passively protecting the reflector against icing. In particular, the thermal insulation is arranged on a side of the reflector that is remote from the road. This ensures reliable operation of the arrangement even under adverse weather conditions.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

Elements of the same design or function are provided with the same reference signs across all figures.

DETAILED DESCRIPTION

In vehicle-to-vehicle communication (Car2Car) and vehicle-to-infrastructure communication (Car2x), it is possible to use not only the conventional mobile radio standards such as e.g. 3G or LTE but also a specially adapted IEEE 802.11 p WLAN so that vehicles can send one another messages on an adhoc point-to-point basis. Alternatively, other communication standards with slightly different frequency bands as e.g. in America or Asia can also be used for this purpose. Whenever IEEE 802.11 p WLAN is mentioned below, this is transferable to these communication standards accordingly.

The messages comprise the respective specific position, speed and direction of movement of the vehicles, for example. If the messages are interchanged between the communicating parties directly, a latency can be kept extremely low, because it is not necessary for a network infrastructure to be consulted in the background. Low latency of this kind is an essential prerequisite for realtime-critical implementations of driver assistance functions. The content of the messages can then be used by passive or active collision avoidance and autonomous driving systems and applied for example as sensor information.

The IEEE 802.11 p WLAN uses a frequency band in the range between 5.8 GHz and 5.9 GHz. In particular in this frequency range, the propagation conditions are critical for an availability of the other communicating parties. Almost direct visibility for the respective communicating parties is required in this instance. According to the specifications of the IEEE 802.11 p WLAN, although dedicated critical messages are permitted to be emitted at a power of up to 2 watts, the majority of messages are sent at lower power. Furthermore, sending is permitted only in a cyclic interval. That is to say that two vehicles can sometimes communicate only very late by adhoc point-to-point connection. In consideration of the respective speed at which the vehicles move toward one another, the propagation conditions and the temporal stipulations for message sending, critical situations can be revealed very easily. If the two vehicles do not have direct visibility among one another, an early warning cannot be provided in doubt by means of communication via the IEEE 802.11 p WLAN communication; this can severely limit the functionality of driver assistance systems such as those mentioned above.

Figure 1A:
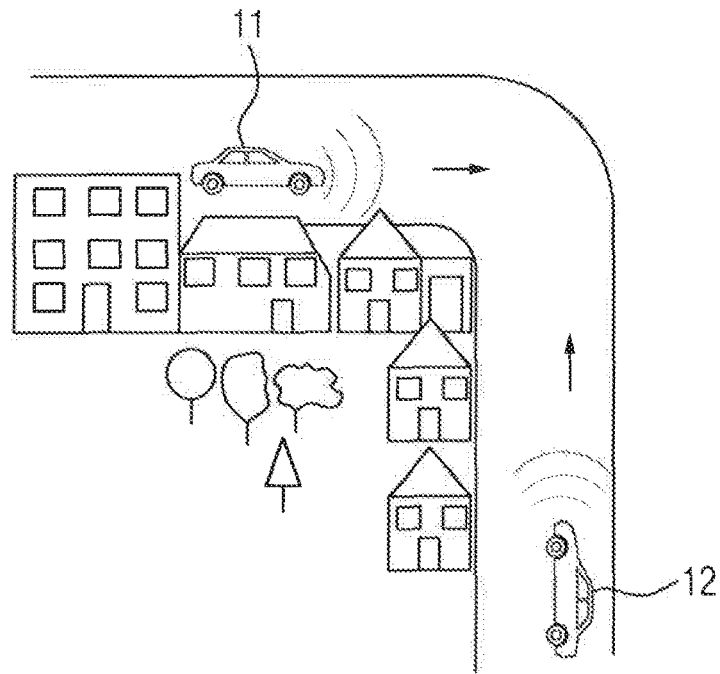
FIG. 1a shows a situation with limited vehicle-to-vehicle communication.

FIG. 1a shows a situation in which two vehicles 11, 12 approach one another along a road via a curve. The buildings depicted on the side of the road that is on the inside of the curve result in complete shading of signals emitted by the vehicles 11, 12. In the region on the outside of the curve, there are meanwhile no buildings or the like, which means that signals emitted by the vehicles 11, 12 remain unscattered and cannot be received by the other vehicle 11, 12. Similar situations are conceivable in which there is no or reduced direct visibility between two approaching vehicles, for example if the wave propagation, at least in regions, is shaded on the side that is on the inside of the curve and, on the side that is on the outside of the curve, there are no further objects that could allow an indirect communication path by means of multipath propagation and/or reflection. At this juncture, it should be mentioned that objects on the side that is on the outside of the curve could also absorb the signals emitted by the vehicles 11, 12 depending on the surface, geometric structure or substance that they consist of. In particular, shrubs, trees, etc., tend to absorb radio waves. Such situations can arise both in urban environments and in rural areas and areas having high vegetation growth, such as e.g. woodland areas.

Figure 1B:
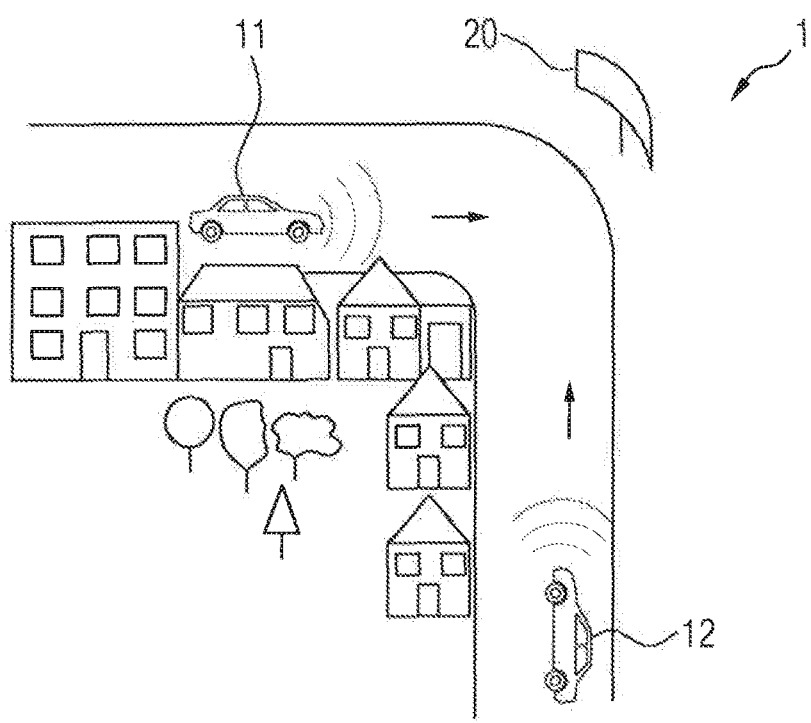
FIG. 1b shows an arrangement according to the invention for communication between motor vehicles.

FIG. 1b is used to depict an exemplary embodiment of an arrangement 1 that ensures reliable communication, in particular by means of IEEE 802.11 p WLAN, between the two vehicles 11, 12 in the situation shown in FIG. 1a. This is not restricted to two vehicles, but rather, in particular in the Car2Car sense, also applies to 1-to-n and n-to-1 communication, since these involve applicable messages being sent/received by all vehicles cyclically by broadcast.

The arrangement 1 comprises a reflector apparatus 20 that is arranged in a tangential orientation on the side of the road that is on the outside of the curve and is configured to reflect electromagnetic radiation in the frequency band of the communication standard used, such as the IEEE 802.11 p WLAN. Hampered propagation conditions preventing direct communication between the two vehicles 11, 12 can be overcome by means of the suitable arrangement of one or more such reflector apparatuses 20 to reflect the radio waves at respective suitable locations. In contrast to the "roadside units" mentioned in the general part of the description for spanning sections or local areas with hampered communication, for which comparatively high purchase, production, installation, operation and maintenance costs are incurred, for example for the communication system including hardware/software, connection to infrastructure and to the electricity grid, power and changing certificates (security requirement from Car2X standard), it is possible for such costs to be kept down and at the same time for low latencies to be ensured by the reflector apparatus 20.

The reflector apparatuses 20 and the geometric form thereof, the surface thereof and the respective positioning in space allow radio waves, in particular in the cited frequency range and in a form adapted to the respective situation, to be selectively deflected in order to allow early communication and early message reception. The reflector apparatuses 20 described can be arranged singly, in distributed fashion or in combination in order to optimize a respective local situation in the best possible way for the purposes of communication.

FIGS. 2a to 2e are used to depict exemplary embodiments of the reflector apparatus 20 for the arrangement shown in FIG. 1b.

In the first exemplary embodiment (FIG. 2a), the reflector apparatus 20 has a reflector 21 and a standpipe 22. The reflector 21 has a planar shape and is attached to the standpipe 22 in a manner similar to a road sign. The reflector 21 can be in the form of metal sheet, for example.

Furthermore, the reflector 21 can be designed to have a lattice-shaped geometry or structure or surface, to have a surface optimized specifically for the frequency range 5.8 GHz-5.9 GHz in the spirit of positive reflection properties, to have a built-in heater (thawing apparatus, including temperature-based feedback control), to have a surface having a self-cleaning effect, or fast removal of e.g. dust, dirt, snow, water, dirty water and other impurities that would reduce the reflective or functional properties, to have a geometry for self-cleaning or for fast removal of the aforementioned impurities, to have passive protection against icing such as appropriate thermal insulation or to optimize thermal capacitance, frost protection, etc.

to have measures to prevent the reflector 21 from dazzling road users, such as coating with a matt lacquer.

In the second exemplary embodiment (FIG. 2b) and the third exemplary embodiment (FIG. 2c), the reflector 21 has a defined geometry for optimum forwarding or reflection of the signals. As such, the reflector 21 in FIG. 2b has a concave geometry that reflects the radio waves of one vehicle 11, 12 to the other vehicle 12, 11 in focused and/or amplified fashion. The reflector 21 can be in concave form in the horizontal direction, in the vertical direction or in a combination of the horizontal and vertical directions.

Figure 2A:
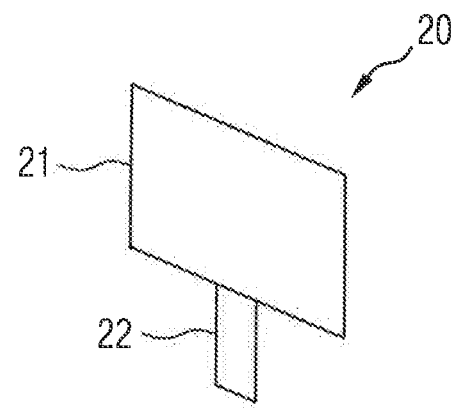
FIGS. 2a to 2e show exemplary embodiments of a reflector apparatus according to the invention for the arrangement shown in FIG. 1b.
Figure 2B:
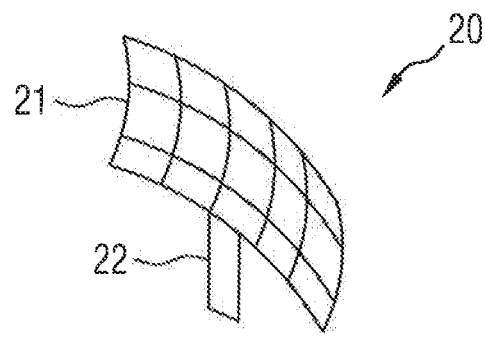
Figure 2C:
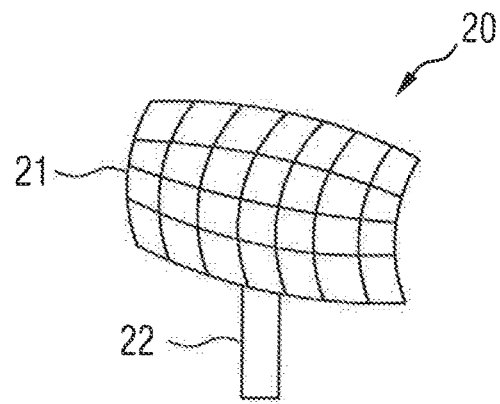
Figure 2D:
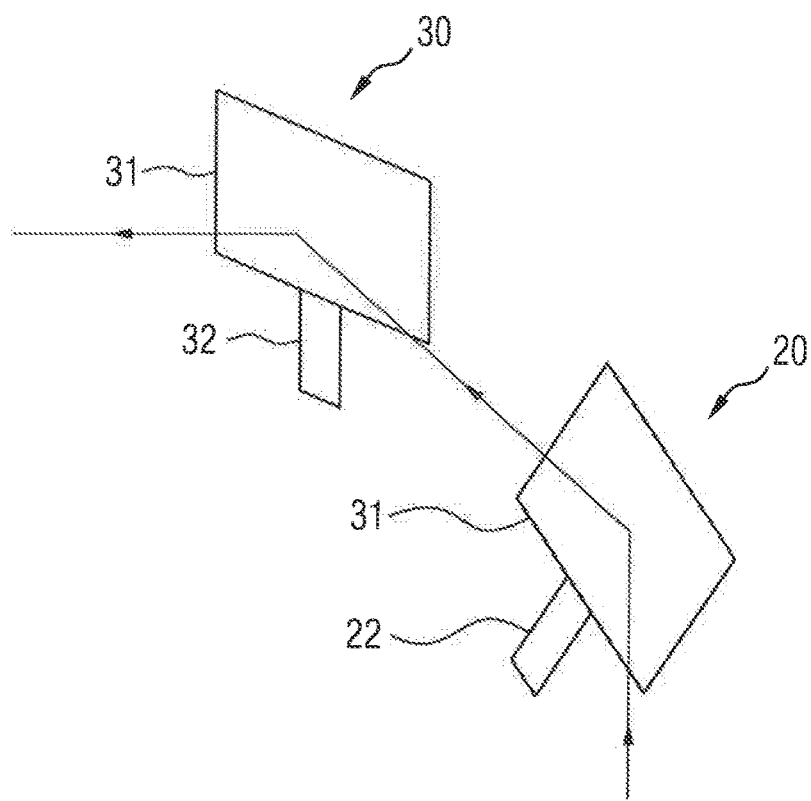
Figure 2E:
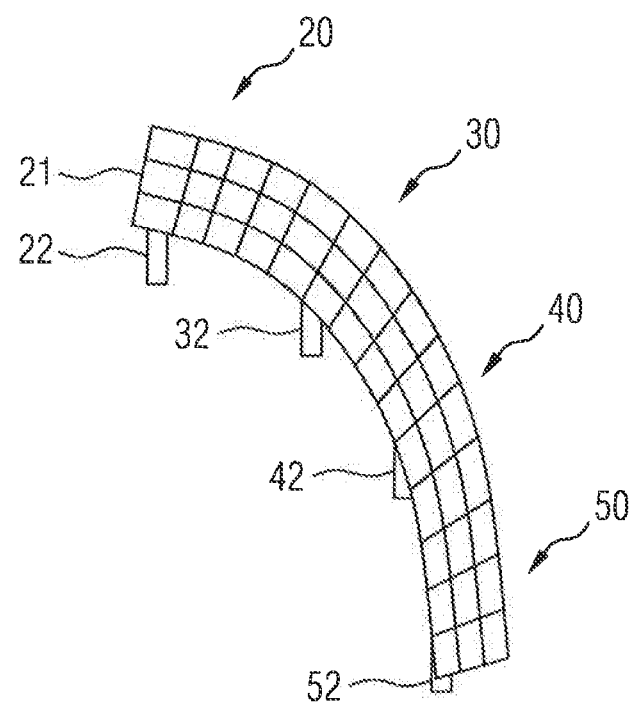

By contrast, the reflector 21 in FIG. 2c has a convex geometry that reflects the radio waves of one vehicle 11, 12 to the other vehicle 12, 11 in spread and/or directed fashion. The reflector 21 can be in convex form in the horizontal direction, in the vertical direction or in a combination of the horizontal and vertical directions.

In the fourth exemplary embodiment (FIG. 2d), there is provision for a further reflector apparatus 30. Incident radio waves of one vehicle 11, 12 are first deflected by the reflector apparatus 20 to the further reflector apparatus 30 and only then forwarded to the other vehicle 12, 11. Suitable arrangement and orientation of the two reflector apparatuses 20, 30 allows multiple reflection, in other words. The two reflector apparatuses 20, 30 are in a physically separate arrangement.

In the fifth exemplary embodiment (FIG. 2e), there is provision for further reflector apparatuses 40, 50 in comparison with the fourth exemplary embodiment. In contrast to the fourth exemplary embodiment, the reflector apparatuses 20-50 are arranged in combination, i.e. they have a common reflector 21 that produces an overall reflection. As in the fourth exemplary embodiment, this is rendered possible by multiple reflection at the common reflector 21.

Reflector apparatuses according to the fifth exemplary embodiment are suitable in particular for elongate curves as in a wood, in order to allow reflection there over as extensive a range as possible to the fullest possible extent at any point.

The reflector apparatuses 20 shown in FIGS. 2a-2e can be of purely passive design and hence very inexpensive in terms of purchase and maintenance costs. Furthermore, the reflector apparatus 20 is theoretically placeable everywhere. The reflector apparatus 20 can be set up in a form similar to a road sign or fixed to existing structures such as buildings, masts or trees, etc. The reflector apparatus 20 is furthermore selectively adaptable to the situation and the local circumstances and can be arranged singly, in distributed fashion or in combination. Similarly, there is the possibility of implementing standard geometries and arrangements to cover similar situations and of benefiting from a further scaling effect.

Figure 3A:
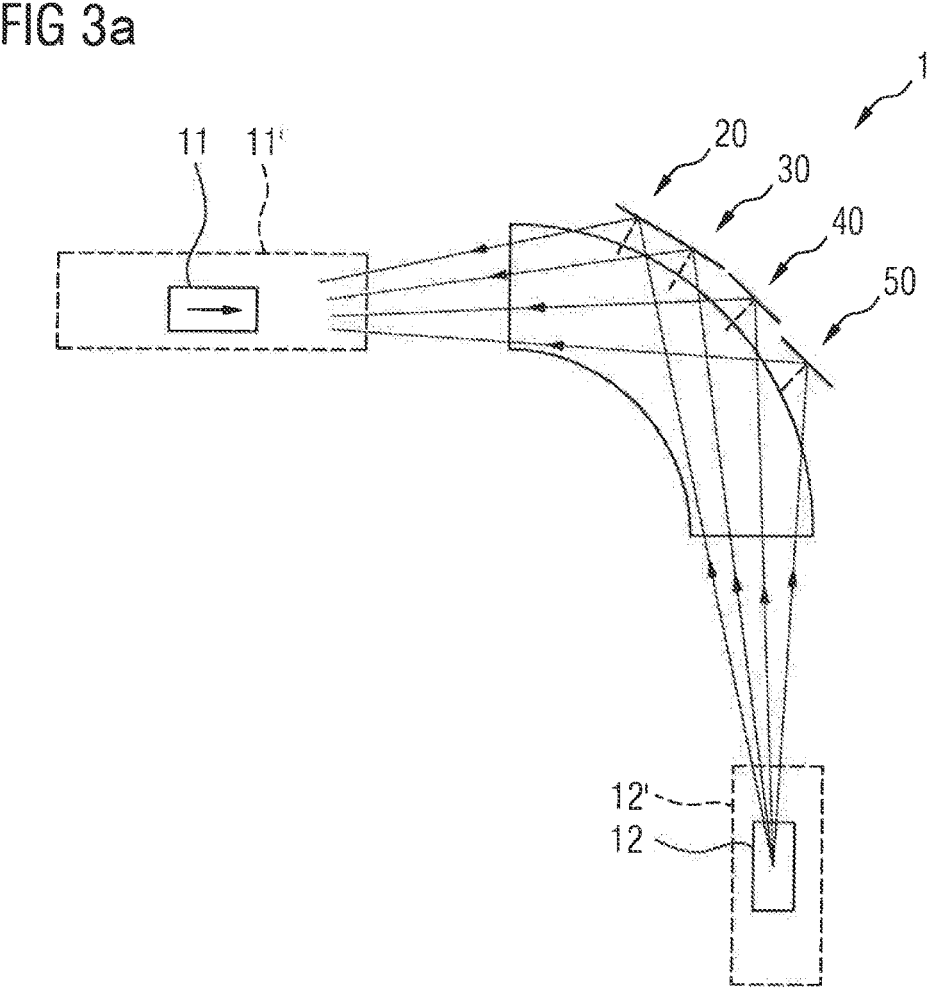
FIGS. 3a and 3b show exemplary embodiments of the arrangement according to the invention.
Figure 3B:
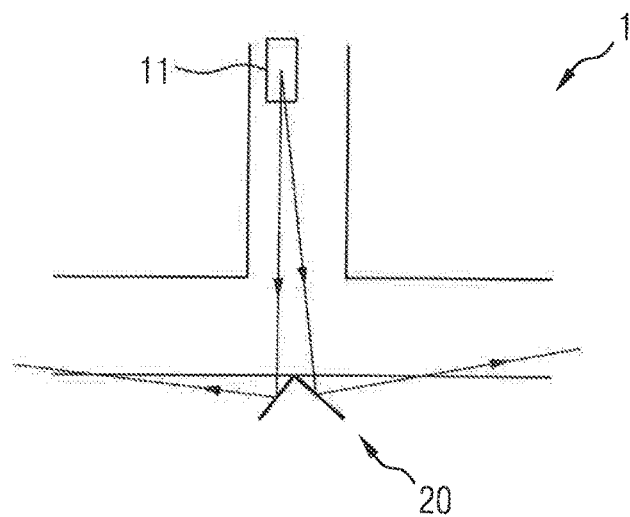

FIGS. 3a and 3b depict further exemplary embodiments of the arrangement 1. As such, the reflector apparatuses 20-50 shown in FIG. 3a are, as indicated in the drawing, arranged in an orientation such that, for each vehicle 11, 12, a prescribed region 11', 12' around the applicable vehicle 11, 12 is focussed in respect of a hazard potential and local circumstances while taking into consideration the communication parameters of the respective situation. The region 11', 12' is taken into consideration in accordance with the orientation and geometric shape of the individual reflectors 21-51 (cf. FIG. 2e).

FIG. 3b further shows a T-junction having the reflector apparatus 20. As depicted, a left-hand part of the reflector apparatus 20 in regard to the figure forms a first angle with the left-hand part of the T-junction and a second angle with the upper part of the T-junction. Similarly, a right-hand part of the reflector apparatus 20 in regard to the figure forms a third angle with the right-hand part of the T-junction and a fourth angle with the upper part of the T-junction. The first, second, third and fourth angles are each between 35° and 55°, in particular 45°, for example. The first to fourth angles can in particular be the same prescribed angle that the reflector apparatus 20 or a portion thereof forms with the road profile.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. An arrangement for communication between motor vehicles, comprising:
 a reflector apparatus secured at a fixed location in an outer region of a curved road in an orientation such that said reflector apparatus deflects electromagnetic radiation in a frequency band between 2.5 GHz and 7.5 GHz that is emitted by a first motor vehicle, situated in a region of a curve entrance, toward a second motor vehicle, situated in the region of a curve exit,
 at least one further reflector apparatus, wherein the reflector apparatuses are each arranged at a fixed location in the outer region of the curved road in a distributed manner from one another; and
 wherein a yaw of the first motor vehicle is changeable over at least a portion of a distance between the curve entrance and the curve exit such that the electromagnetic radiation is first reflected by the reflector apparatus and then reflected by the at least one further reflector apparatus such that an elongated curve is spanned.

2. The arrangement as claimed in claim 1, wherein the reflector apparatus is secured to an existing building, mast or tree.

3. The arrangement as claimed in claim 1, wherein the reflector apparatuses are secured in an orientation such that the electromagnetic radiation emitted by the first motor vehicle is reflected toward the at least one further reflector apparatus by the reflector apparatus and is deflected to the second motor vehicle by the at least one further reflector apparatus.

4. The arrangement as claimed in claim 1, further comprising a reflector configured to deflect electromagnetic radiation in the frequency band between 2.5 GHz and 7.5 GHz.

5. The reflector apparatus as claimed in claim 4, wherein the reflector is configured to deflect electromagnetic radiation in the frequency band between 5.8 GHz inclusive and 5.9 GHz inclusive.

6. The arrangement as claimed in claim 4, wherein the reflector comprises or consists of a metal sheet.

7. The arrangement as claimed in claim 4, wherein a surface of the reflector is convexly curved in at least one direction.

8. The arrangement as claimed in claim 4, wherein a surface of the reflector is concavely curved in at least one direction.

9. The arrangement as claimed in claim 4, wherein a surface of the reflector is planar.

10. The arrangement as claimed in claim 4, further comprising a heater for selectively adjusting the temperature of the reflector.

11. The arrangement as claimed in claim 4, further comprising thermal insulation for passively protecting the reflector against icing.

12. An arrangement for communication between motor vehicles, comprising:
 a plurality of reflector apparatus secured in a distributed manner at fixed locations in an outer region of the curved road in an orientation such that said plurality of reflector apparatus deflect electromagnetic radiation in a frequency band between 2.5 GHz and 7.5 GHz that is emitted by a first motor vehicle, situated in a region of a curve entrance, toward a second motor vehicle, situated in the region of a curve exit, wherein the reflector has a non-planar surface; and
 wherein a yaw of the first motor vehicle is changeable over at least a portion of a distance between the curve entrance and the curve exit such that the electromagnetic radiation is first reflected by the plurality of reflector apparatus over a range of vehicle yaw positions such that an elongated curve is spanned.

* * * * *